United States Patent
Kadomi et al.

(10) Patent No.: US 9,405,167 B2
(45) Date of Patent: Aug. 2, 2016

(54) LIQUID-CRYSTAL LENS AND LIQUID-CRYSTAL LENS-CELL

(71) Applicant: NIPPON ELECTRIC GLASS CO., LTD., Otsu-shi, Shiga (JP)

(72) Inventors: Masaaki Kadomi, Otsu (JP); Hirokazu Tanaka, Otsu (JP); Masanori Wada, Otsu (JP); Takasi Akimoto, Nagahama (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 14/370,259

(22) PCT Filed: Jan. 11, 2013

(86) PCT No.: PCT/JP2013/050443
§ 371 (c)(1),
(2) Date: Jul. 2, 2014

(87) PCT Pub. No.: WO2013/114933
PCT Pub. Date: Aug. 8, 2013

(65) Prior Publication Data
US 2014/0368776 A1    Dec. 18, 2014

(30) Foreign Application Priority Data

Jan. 30, 2012 (JP) ................. 2012-016630
Feb. 21, 2012 (JP) ................. 2012-034685
Feb. 21, 2012 (JP) ................. 2012-034829

(51) Int. Cl.
*G02F 1/29* (2006.01)
*G02B 3/14* (2006.01)
*G02F 1/1347* (2006.01)

(52) U.S. Cl.
CPC .. *G02F 1/29* (2013.01); *G02B 3/14* (2013.01); *G02F 1/13471* (2013.01); *G02F 2001/294* (2013.01)

(58) Field of Classification Search
CPC ....... G02B 3/14; G02F 1/29; G02F 2001/294; G02F 1/13471
See application file for complete search history.

(56) References Cited

U.S. PATENT DOCUMENTS

| 4,919,520 A | 4/1990 | Okada et al. |
| 2007/0139333 A1 | 6/2007 | Sato et al. |
| 2011/0181797 A1 | 7/2011 | Galstian et al. |

FOREIGN PATENT DOCUMENTS

| CN | 101010619 A | 8/2007 |
| CN | 101672990 A | 3/2010 |

(Continued)

OTHER PUBLICATIONS

Official Communication issued in International Patent Application No. PCT/JP2013/050443, mailed on Feb. 12, 2013.

*Primary Examiner* — Timothy L Rude
(74) *Attorney, Agent, or Firm* — Keating and Bennett, LLP

(57) ABSTRACT

An object of the present invention is to provide a liquid-crystal lens having excellent imaging performance. A liquid-crystal lens (1) according to the present invention includes a first liquid-crystal layer (11), a second liquid-crystal layer (12), a third liquid-crystal layer (13), and a fourth liquid-crystal layer (14) which are arranged in this order along an optical axis (C). The first liquid-crystal layer (11) and the second liquid-crystal layer (12) are 90° different in alignment direction from each other in a plane perpendicular to the optical axis (C). The first liquid-crystal layer (11) and the fourth liquid-crystal layer (14) are 180° different in alignment direction from each other in the plane perpendicular to the optical axis (C). The second liquid-crystal layer (12) and the third liquid-crystal layer (13) are 180° different in alignment direction from each other in the plane perpendicular to the optical axis (C).

7 Claims, 5 Drawing Sheets

(56) References Cited

FOREIGN PATENT DOCUMENTS

| | | | |
|---|---|---|---|
| CN | 102138102 A | 7/2011 | |
| JP | 2006-313243 A | * 11/2006 | |
| JP | 2010-107686 A | 5/2010 | |
| KR | 10-0832897 B1 | 5/2008 | |
| WO | 2006/022346 A1 | 3/2006 | |
| WO | 2011/105437 A1 | 9/2011 | |

* cited by examiner

LIQUID-CRYSTAL LENS AND LIQUID-CRYSTAL LENS-CELL

TECHNICAL FIELD

This invention relates to liquid-crystal lenses and cells for liquid-crystal lenses.

BACKGROUND ART

Liquid-crystal lenses with variable refractive index have heretofore been proposed. For example, a liquid-crystal lens including a single liquid-crystal layer generally refracts only a specific polarized light component and does not refract the other polarized light components. Therefore, it is necessary to dispose a polarizing plate in front of the liquid-crystal lens so that only the specific polarized light component to be refracted by the liquid-crystal layer can enter the liquid-crystal layer. This presents a problem of significant light intensity loss.

In view of the foregoing problem, for example, Patent Literature 1 proposes to obtain a liquid-crystal lens requiring no polarizing plate by disposing a first liquid-crystal lens and a second liquid-crystal lens to have their respective alignment directions orthogonal to each other in a plane perpendicular to the optical axis.

In addition, Patent Literature 1 also proposes that one of the first liquid-crystal lens and second liquid-crystal lens close to the image plane has a smaller focal length than the other liquid-crystal lens close to the object. Patent Literature 1 describes that by doing so, for example, the gap between the locations of images formed by P-polarized light and S-polarized light can be reduced to achieve excellent imaging performance.

CITATION LIST

Patent Literature

Patent Literature 1: JP-A-2010-107686

SUMMARY OF INVENTION

Technical Problem

In recent years, there are demands to further improve the imaging performance of liquid-crystal lenses.

A principal object of the present invention is to provide a liquid-crystal lens having excellent imaging performance.

Solution to Problem

A liquid-crystal lens according to the present invention includes a first liquid-crystal layer, a second liquid-crystal layer, a third liquid-crystal layer, and a fourth liquid-crystal layer which are arranged in this order along an optical axis. The first liquid-crystal layer and the second liquid-crystal layer are 90° different in alignment direction from each other in a plane perpendicular to the optical axis. The first liquid-crystal layer and the fourth liquid-crystal layer are 180° different in alignment direction from each other in the plane perpendicular to the optical axis. The second liquid-crystal layer and the third liquid-crystal layer are 180° different in alignment direction from each other in the plane perpendicular to the optical axis.

A composite focal length of the first liquid-crystal layer and the fourth liquid-crystal layer for incident light having a first polarization direction is preferably equal to a composite focal length of the second liquid-crystal layer and the third liquid-crystal layer for incident light having a second polarization direction.

The liquid-crystal lens according to the present invention may further include a first electrode and a second electrode which sandwich the first to fourth liquid-crystal layers therebetween and are configured to apply an electric field to the first to fourth liquid-crystal layers.

The liquid-crystal lens according to the present invention may further include: a first electrode and a second electrode which sandwich the first and second liquid-crystal layers therebetween and are configured to apply an electric field to the first and second liquid-crystal layers; and a third electrode and a fourth electrode which sandwich the third and fourth liquid-crystal layers therebetween and are configured to apply an electric field to the third and fourth liquid-crystal layers.

One of the first and fourth liquid-crystal layers located on one side of the optical axis may be thinner than the other liquid-crystal layer located on the other side of the optical axis and one of the second and third liquid-crystal layers located on the one side of the optical axis may be thinner than the other liquid-crystal layer located on the other side of the optical axis.

Furthermore, liquid crystal molecules in one of the first and fourth liquid-crystal layers located on one side of the optical axis may have a smaller pretilt angle than liquid crystal molecules in the other liquid-crystal layer located on the other side of the optical axis and liquid crystal molecules in one of the second and third liquid-crystal layers located on the one side of the optical axis may have a smaller pretilt angle than liquid crystal molecules in the other liquid-crystal layer located on the other side of the optical axis.

A cell for a liquid-crystal lens according to the present invention is provided with a first interior space to be filled with liquid crystal, a second interior space to be filled with liquid crystal, a third interior space to be filled with liquid crystal, and a fourth interior space to be filled with liquid crystal, the first, second, third, and fourth interior spaces being disposed in this order along one direction. The cell for a liquid-crystal lens according to the present invention includes a first alignment film, a second alignment film, a third alignment film, and a fourth alignment film. The first alignment film is provided to face the first interior space. The second alignment film is provided to face the second interior space. The third alignment film is provided to face the third interior space. The fourth alignment film is provided to face the fourth interior space. The first to fourth alignment films are provided so that when the first to fourth interior spaces are filled with liquid crystal, the first liquid-crystal layer and the second liquid-crystal layer are 90° different in alignment direction from each other in a plane perpendicular to an optical axis, the first liquid-crystal layer and the fourth liquid-crystal layer are 180° different in alignment direction from each other in the plane perpendicular to the optical axis, and the second liquid-crystal layer and the third liquid-crystal layer are 180° different in alignment direction from each other in the plane perpendicular to the optical axis.

Advantageous Effects of Invention

The present invention can provide a liquid-crystal lens having excellent imaging performance.

DESCRIPTION OF EMBODIMENTS

Figure 1:
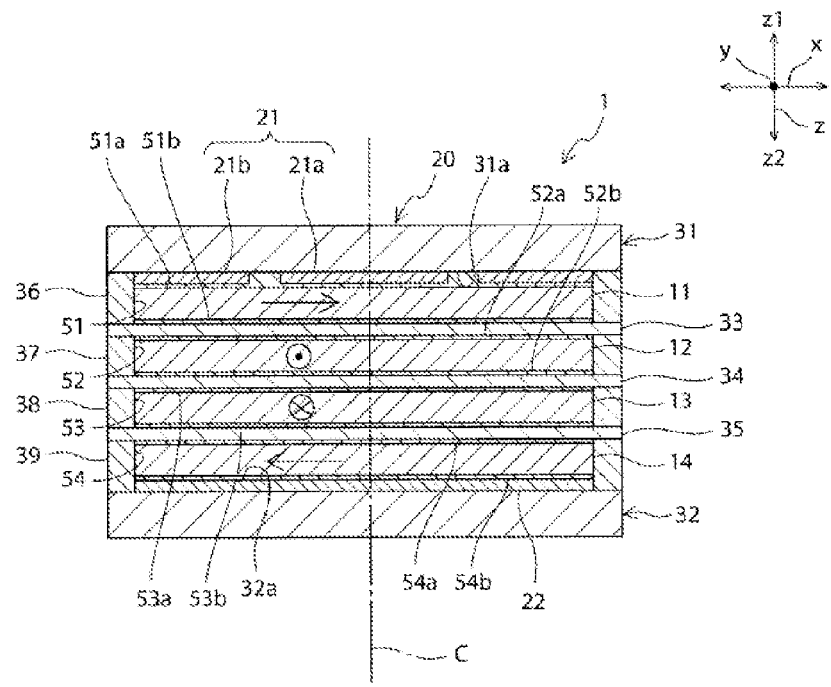
FIG. 1 is a schematic cross-sectional view of a liquid-crystal lens according to a first embodiment.

Hereinafter, a description will be given of examples of preferred embodiments for working of the present invention. However, the following embodiments are simply illustrative. The present invention is not at all intended to be limited to the following embodiments.

Throughout the drawings to which the embodiments and the like refer, elements having substantially the same functions will be referred to by the same reference signs. The drawings to which the embodiments and the like refer are schematically illustrated, and the dimensional ratios and the like of objects illustrated in the drawings may be different from those of the actual objects. Different drawings may have different dimensional ratios and the like of the objects. Dimensional ratios and the like of specific objects should be determined in consideration of the following descriptions.

First Embodiment

FIG. 1 is a schematic cross-sectional view of a liquid-crystal lens 1 according to a first embodiment. The liquid-crystal lens 1 includes a cell 20 and first to fourth liquid-crystal layers 11 to 14 provided in the cell 20 and containing liquid crystal molecules. The first to fourth liquid-crystal layers 11 to 14 are arranged in this order along the optical axis C. These first to fourth liquid-crystal layers 11 to 14 are sandwiched by first and second electrodes 21, 22. The first and second electrodes 21, 22 apply an electric field to the first to fourth liquid-crystal layers 11 to 14, so that the refractive index of the liquid-crystal lens 1 changes. The optical axis C is the optical axis of the entire liquid-crystal lens 1 and each of the optical axes of the first to fourth liquid-crystal layers 11 to 14 does not necessarily coincide with the optical axis C.

More specifically, the liquid-crystal lens 1 includes a first substrate 31 and a second substrate 32 which are disposed to face each other. Three intermediate substrates 33 to 35 are interposed between the first substrate 31 and the second substrate 32. The first to fourth liquid-crystal layers 11 to 14 are provided in four spaces defined by the three intermediate substrates 33 to 35, the first and second substrates 31, 32, and spacer members 36 to 39. The three intermediate substrates 33 to 35, the first and second substrates 31, 32, and the spacer members 36 to 39 form a cell 20 for a liquid-crystal lens. A first interior space 51 is defined between the first substrate 31 and the intermediate substrate 33. A second interior space 52 is defined between the intermediate substrate 33 and the intermediate substrate 34. A third interior space 53 is defined between the intermediate substrate 34 and the intermediate substrate 35. A fourth interior space 54 is defined between the intermediate substrate 35 and the second substrate 32. Liquid-crystal inlets for use in filling liquid crystal into the interior spaces 51 to 54 may be provided in the substrates 31 to 35 or in the spacer members 36 to 39. Through holes may be provided in the intermediate substrates 33 to 35 to allow communication among the first to fourth interior spaces 51 to 54.

In other words, the first to fourth liquid-crystal layers 11 to 14 may communicate with each other. In this case, the production of pressure variations among the first to fourth liquid-crystal layers 11 to 14 can be reduced.

Still more specifically, the first liquid-crystal layer 11 is provided in an approximately cylindrical space (the first interior space 51) defined by the first substrate 31, the intermediate substrate 33 disposed to face the first substrate 31, and the spacer member 36.

The first substrate 31, the intermediate substrate 33, and the spacer member 36 can be made of, for example, glass. The second substrate 32, the intermediate substrates 34, 35, and the spacer members 37 to 39 can be likewise made of glass.

The thickness of the first substrate 31 and the second substrate 32 can be, for example, about 0.1 mm to about 1 mm. The thickness of the intermediate substrates 33 to 35 can be, for example, about 3 µm to about 80 µm. The thickness of the spacer members 36 to 39 can be appropriately selected according to the thickness of the first to fourth liquid-crystal layers 11 to 14 dependent on a desired optical power, the response speed required for the first to fourth liquid-crystal layers 11 to 14, or the like. The thickness of the spacer members 36 to 39 can be, for example, about 1 µm to about 80 µm.

Figure 2:
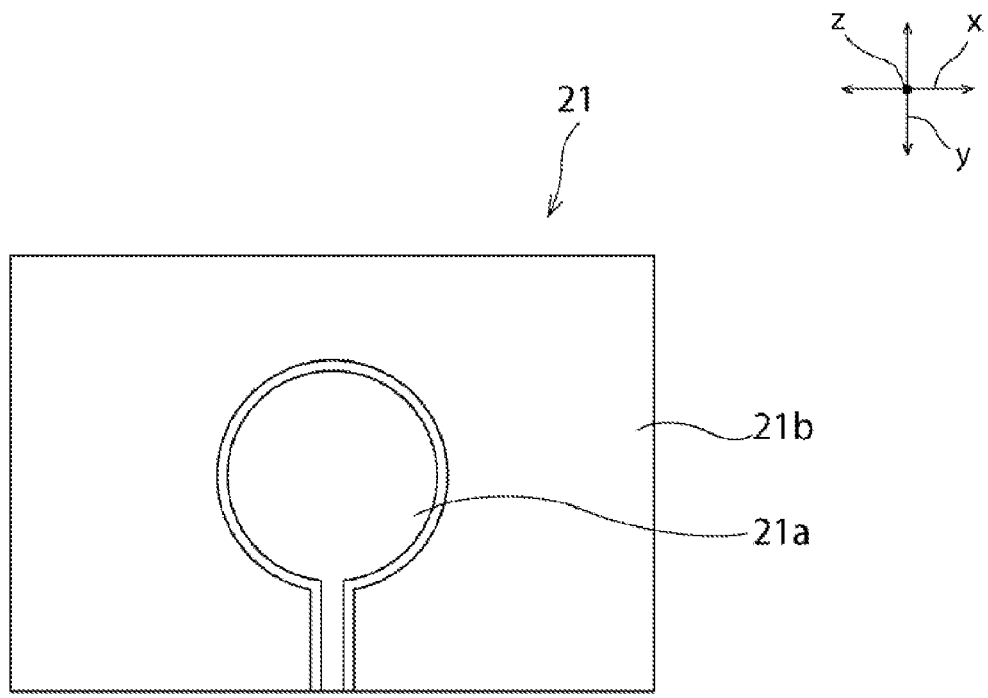
FIG. 2 is a schematic plan view of a first electrode in the first embodiment.

The first electrode 21 is disposed on a surface 31a of the first substrate 31 close to the first liquid-crystal layer 11. No particular limitation is placed on the shape of the first electrode 21. In this embodiment, as shown in FIG. 2, the first electrode 21 includes a circular first portion 21a and a second portion 21b surrounding the first portion 21a. The first electrode 21 can be made of a transparent conductive oxide, such as indium tin oxide (ITO).

Although not shown, in this embodiment, an insulating film is disposed on the surface 31a of the first substrate 31 to cover the first electrode 21. The insulating film is covered with a high-resistivity film. The high-resistivity film is covered with a first alignment film 51a facing the first interior space 51. Furthermore, a first alignment film 51b facing the first interior space 51 is also disposed on a surface of the intermediate substrate 33 close to the first liquid-crystal layer 11. These alignment films 51a, 51b align liquid crystal molecules in the first liquid-crystal layer 11. However, the insulating film and the high-resistivity film are not necessarily essential in the present invention.

The insulating film can be made of, for example, silicon oxide or the like. The high-resistivity film can be made of, for example, zinc oxide or the like. The alignment film can be made of, for example, a rubbed polyimide film or the like. The other insulating films, high-resistivity films, and alignment films appearing in this embodiment can be made of like materials.

The second liquid-crystal layer 12 is provided in an approximately cylindrical space (the second interior space 52) defined by the intermediate substrate 33, the intermediate substrate 34 disposed to face the intermediate substrate 33, and the spacer member 37.

Respective second alignment films 52a, 52b facing the second interior space 52 are disposed on respective surfaces of the intermediate substrates 33, 34 close to the second liquid-crystal layer 12. These second alignment films 52a, 52b align liquid crystal molecules in the second liquid-crystal layer 12.

The third liquid-crystal layer 13 is provided in an approximately cylindrical space (the third interior space 53) defined by the intermediate substrate 34, the intermediate substrate 35 disposed to face the intermediate substrate 34, and the spacer member 38.

Respective third alignment films 53a, 53b facing the third interior space 53 are provided on respective surfaces of the intermediate substrates 34, 35 close to the third liquid-crystal layer 13. These third alignment films 53a, 53b align liquid crystal molecules in the third liquid-crystal layer 13.

The fourth liquid-crystal layer 14 is provided in an approximately cylindrical space (the fourth interior space 54) defined by the intermediate substrate 35, the second substrate 32 disposed to face the intermediate substrate 35, and the spacer member 39.

The second electrode 22 is provided on a surface 32a of the second substrate 32 close to the fourth liquid-crystal layer 14. The second electrode 22 is provided in the shape of a sheet to face the first and second portions 21a, 21b of the first electrode 21. The second electrode 22 is disposed over the substantially entire region of the surface 32a where the liquid-crystal layers 11 to 14 are provided. A fourth alignment film 54b is provided on the surface 32a to cover the second electrode 22 and face the fourth interior space 54. Furthermore, a fourth alignment film 54a facing the fourth interior space 54 is also provided on a surface of the intermediate substrate 35 close to the fourth liquid-crystal layer 14. These fourth alignment films 54a, 54b align liquid crystal molecules in the fourth liquid-crystal layer 14.

As shown in FIG. 1, in the liquid-crystal lens 1, the first liquid-crystal layer 11 and the second liquid-crystal layer 12 are 90° different in alignment direction from each other in a plane perpendicular to the optical axis C. The first liquid-crystal layer 11 and the fourth liquid-crystal layer 14 are 180° different in alignment direction from each other in the plane perpendicular to the optical axis C. The second liquid-crystal layer 12 and the third liquid-crystal layer 13 are 180° different in alignment direction from each other in the plane perpendicular to the optical axis C.

For example, when each of the first and fourth liquid-crystal layers 11, 14 has the light polarizing effect on P-polarized incident light, each of the second and third liquid-crystal layers 12, 13 has the light polarizing effect on S-polarized incident light. Contrariwise, for example, when each of the first and fourth liquid-crystal layers 11, 14 has the light polarizing effect on S-polarized incident light, each of the second and third liquid-crystal layers 12, 13 has the light polarizing effect on P-polarized incident light. In this manner, in the liquid-crystal lens 1, for example, the two liquid-crystal layers 11, 14 having the light polarizing effect on one of P-polarized incident light and S-polarized incident light are disposed apart on both sides in the direction of the optical axis C, while the other two liquid-crystal layers 12, 13 having the light polarizing effect on the other of P-polarized incident light and S-polarized incident light are disposed between the first-mentioned two liquid-crystal layers 11, 14. Furthermore, out of the four liquid-crystal layers 11 to 14, each two liquid-crystal layers having the light polarizing effect on the same polarized light are 180° different in alignment direction from each other in the plane perpendicular to the optical axis C.

On another note, for example, in a liquid-crystal lens including a single liquid-crystal layer, it is necessary to dispose a polarizing plate in front of the liquid-crystal lens to avoid that light components other than a polarized light component for which the liquid-crystal layer has the light polarizing effect enter the liquid-crystal layer. Therefore, the light intensity loss becomes large.

Figure 3:
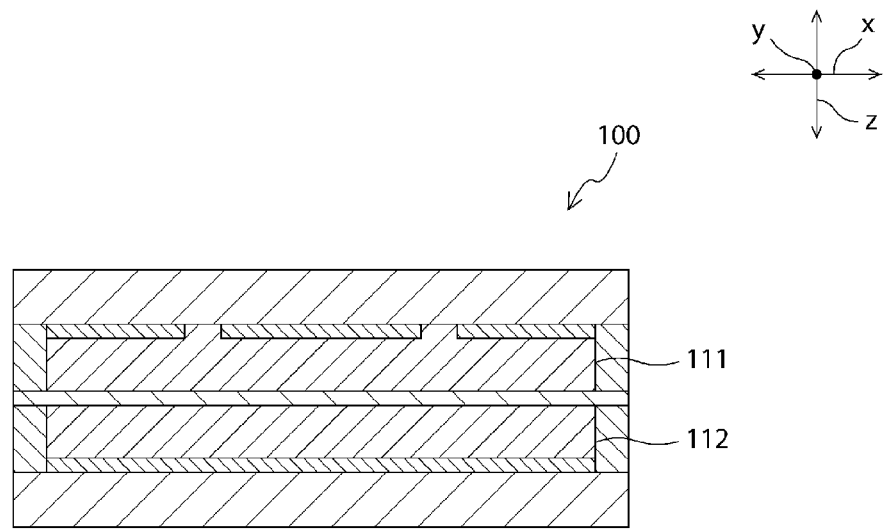
FIG. 3 is a schematic cross-sectional view of a liquid-crystal lens according to a first reference example.

As shown as an alternative in FIG. 3, for example, a liquid-crystal lens 100 including a first liquid-crystal layer 111 having the light polarizing effect on P-polarized incident light and a second liquid-crystal layer 112 having the light polarizing effect on S-polarized incident light requires no polarizing plate. Therefore, the light intensity loss can be reduced.

However, if the optical power of the first liquid-crystal layer 111 is equal to that of the second liquid-crystal layer 112, the focal position of the first liquid-crystal layer 111 in the direction of optical axis for P-polarized incident light is different from the focal position of the second liquid-crystal layer 112 in the direction of optical axis for S-polarized incident light. Therefore, P-polarized light and S-polarized light are focused on different positions in the direction of optical axis, so that sufficient imaging performance cannot be achieved.

For example, it is conceivable to match the focal position of the first liquid-crystal layer 111 for P-polarized incident light with the focal position of the second liquid-crystal layer 112 for S-polarized incident light by making the second liquid-crystal layer 112 thicker than the first liquid-crystal layer 111 to make the optical power of the second liquid-crystal layer 112 for S-polarized incident light stronger than that of the first liquid-crystal layer 111 for P-polarized incident light. With this approach, it is possible to match the focal position for P-polarized light with the focal position for S-polarized light, for example, if the first and second liquid-crystal layers 111, 112 have a specified refractive index. However, it is difficult to match the focal position for P-polarized light with the focal position for S-polarized light regardless of the refractive indices of the first liquid-crystal layer 111 and the second liquid-crystal layer 112. Therefore, the liquid-crystal lens 100 achieves excellent imaging performance at a particular refractive index but has difficulty achieving excellent imaging performance at the other refractive indices.

Furthermore, in the liquid-crystal lens 100, the direction of rubbing of alignment films disposed on both sides of the first liquid-crystal layer 111 is orthogonal to the direction of rubbing of alignment films disposed on both sides of the second liquid-crystal layer 112. Now suppose that the direction of rubbing of the alignment films disposed on both sides of the first liquid-crystal layer 111 is the direction x and the direction of rubbing of the alignment films disposed on both sides of the second liquid-crystal layer 112 is the direction y. The focal point of the first liquid-crystal layer 111 is offset in the direction x from the geometric center of the first and second liquid-crystal layers 111, 112 when viewed from the direction z. On the other hand, the focal point of the second liquid-crystal layer 112 is offset in the direction y from the geometric center of the first and second liquid-crystal layers 111, 112 when viewed from the direction z. Therefore, the focal position for P-polarized light and the focal position for S-polarized light are different from each other in a plane perpendicular to the optical axis. Thus, even if the focal position for P-polarized light can be aligned with the focal position for S-polarized light in the same plane, the focal position for P-polarized light cannot be exactly matched with the focal position for S-polarized light. Hence, the liquid-crystal lens 100 cannot achieve sufficiently excellent imaging performance.

In addition, there also arises a problem in that the distance between the geometric center of the first and second liquid-crystal layers 111, 112 when viewed from the direction z and each of the focal positions for P-polarized light and S-polarized light in the plane perpendicular to the direction z varies with the refractive index of the first or second liquid-crystal layer 111, 112.

In contrast, in the liquid-crystal lens 1, the first and fourth liquid-crystal layers 11, 14 having the light polarizing effect on incident light having a first polarization direction are disposed on both sides in the direction of the optical axis C, while the second and third liquid-crystal layers 12, 13 having the light polarizing effect on incident light having a second polarization direction are disposed between the first liquid-crystal layer 11 and the fourth liquid-crystal layer 14 in the direction of the optical axis C. Thus, the difference in focal position between incident light having the first polarization direction and incident light having the second polarization direction can be reduced. Therefore, excellent imaging performance can be achieved.

From the viewpoint of achieving more excellent imaging performance, the composite focal length of the first liquid-crystal layer 11 and the fourth liquid-crystal layer 14 for incident light having the first polarization direction is preferably equal to the composite focal length of the second liquid-crystal layer 12 and the third liquid-crystal layer 14 for incident light having the second polarization direction.

Herein, the equality of the composite focal length of the first liquid-crystal layer and the fourth liquid-crystal layer to the composite focal length of the second liquid-crystal layer and the third liquid-crystal layer means that the difference between the composite focal length of the first liquid-crystal layer and the fourth liquid-crystal layer and the composite focal length of the second liquid-crystal layer and the third liquid-crystal layer falls within the range of from 85% to 115% of the average value between the composite focal length of the first liquid-crystal layer and the fourth liquid-crystal layer and the composite focal length of the second liquid-crystal layer and the third liquid-crystal layer.

Furthermore, in the liquid-crystal lens 1, the fourth liquid-crystal layer 14 is provided to be 180° different in alignment direction from the first liquid-crystal layer 11. The direction of offset of the focal position of the first liquid-crystal layer 11 alone in the plane perpendicular to the optical axis C is 180° different from the direction of offset of the focal position of the fourth liquid-crystal layer 14 alone in the plane perpendicular to the optical axis C. Therefore, the offset of the focal position of the first liquid-crystal layer 11 in the plane perpendicular to the optical axis C and the offset of the focal position of the fourth liquid-crystal layer 14 in the plane perpendicular to the optical axis C cancel each other out, so that the amount of offset of the focal position of the entire liquid-crystal lens 1 from the optical axis C for incident light having the first polarization direction in the plane perpendicular to the optical axis C can be reduced. Likewise, in the liquid-crystal lens 1, the third liquid-crystal layer 13 is provided to be 180° different in alignment direction from the second liquid-crystal layer 12. Therefore, the offset of the focal position of the second liquid-crystal layer 12 in the plane perpendicular to the optical axis C and the offset of the focal position of the third liquid-crystal layer 13 in the plane perpendicular to the optical axis C cancel each other out, so that the amount of offset of the focal position of the entire liquid-crystal lens 1 from the optical axis C for incident light having the second polarization direction in the plane perpendicular to the optical axis C can be reduced. Hence, more excellent imaging performance can be achieved.

In the case where an object is placed on the side of the lens facing the substrate 31 (on the Z1 side) and an image plane is formed on the side of the lens facing the substrate 32 (on the Z2 side), the first liquid-crystal layer 11 is located closer to the object side z1 and farther from the image plane than the fourth liquid-crystal layer 14. Thus, the optical path length between the first liquid-crystal layer 11 and the image plane is longer than the optical path length between the fourth liquid-crystal layer 14 and the image plane. Therefore, if the first liquid-crystal layer 11 and the fourth liquid-crystal layer 14 have the same thickness, the amount of offset of the focal position due to the light polarizing effect of the first liquid-crystal layer 11 will be larger than the amount of offset of the focal position due to the light polarizing effect of the fourth liquid-crystal layer 14.

Figure 6:
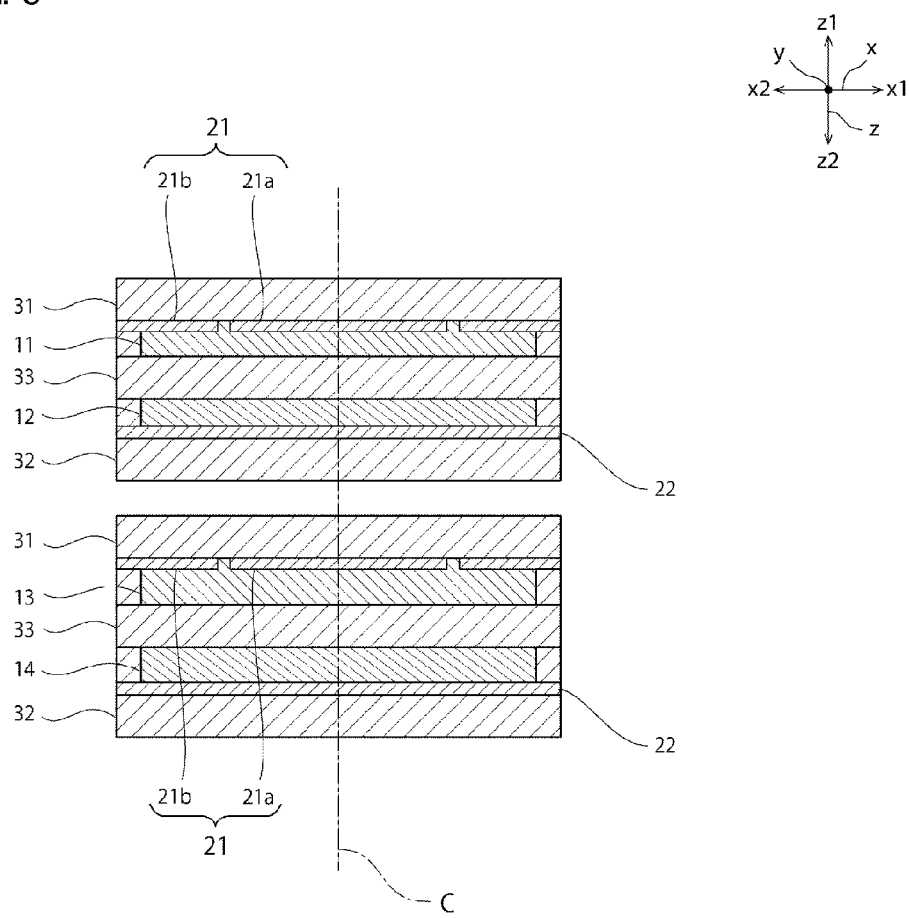
FIG. 6 is a schematic cross-sectional view of a liquid-crystal lens according to a first modification.
Figure 7:
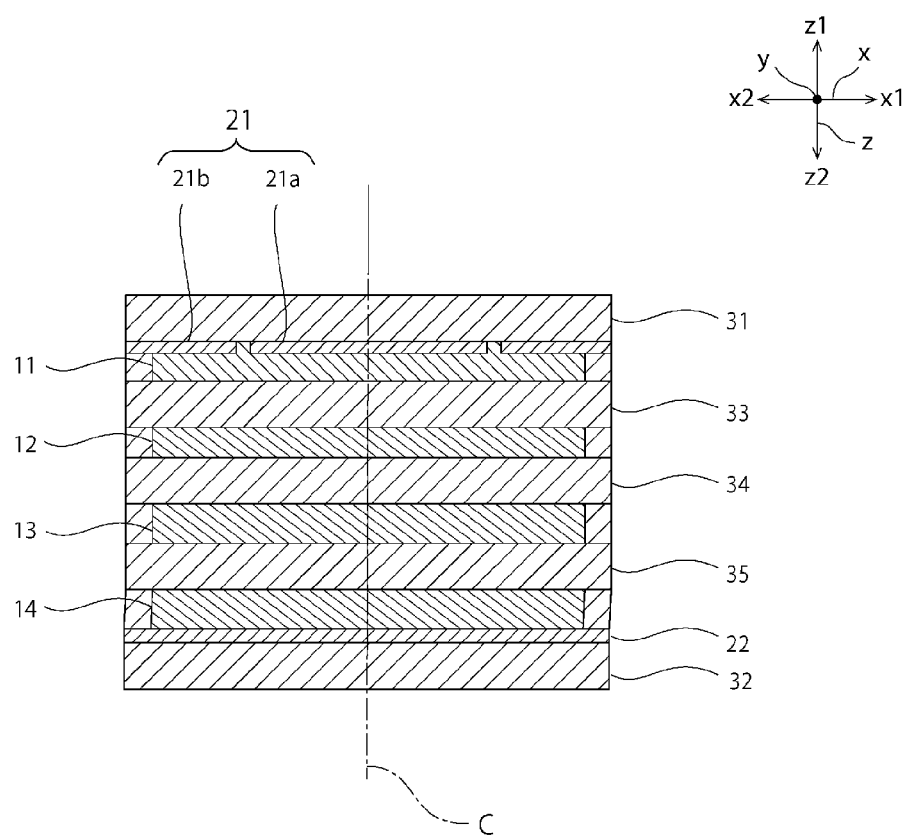
FIG. 7 is a schematic cross-sectional view of a liquid-crystal lens according to a second modification.

From this viewpoint, as in liquid-crystal lenses shown in FIGS. 6 and 7, it is preferred that the first liquid-crystal layer 11 located on the object side z1 should have a smaller thickness than the fourth liquid-crystal layer 14 located on the image plane side z2. In this case, the difference between the amount of offset of the focal position due to the light polarizing effect of the first liquid-crystal layer 11 and the amount of offset of the focal position due to the light polarizing effect of the fourth liquid-crystal layer 14 will be further reduced. Likewise, it is preferred that the second liquid-crystal layer 12 located on the object side z1 should have a smaller thickness than the third liquid-crystal layer 13 located on the image plane side z2. In this case, the difference between the amount of offset of the focal position due to the light polarizing effect of the second liquid-crystal layer 12 and the amount of offset of the focal position due to the light polarizing effect of the third liquid-crystal layer 13 will be further reduced. Therefore, the amount of offset between the focal position of polarized light on which the first and fourth liquid-crystal layers 11, 14 have the light polarizing effect and the focal position of polarized light on which the second and third liquid-crystal layers 12, 13 have the light polarizing effect can be further reduced. As a result, higher imaging performance can be achieved.

Furthermore, liquid crystal molecules in the first liquid-crystal layer 11 located on the object side z1 preferably have a smaller pretilt angle than liquid crystal molecules in the fourth liquid-crystal layer 14 located on the image plane side z2. In this case, the difference between the amount of offset of the focal position due to the light polarizing effect of the first liquid-crystal layer 11 and the amount of offset of the focal position due to the light polarizing effect of the fourth liquid-crystal layer 14 will be further reduced. Likewise, liquid crystal molecules in the second liquid-crystal layer 12 located on the object side z1 preferably have a smaller pretilt angle than liquid crystal molecules in the third liquid-crystal layer 13 located on the image plane side z2. In this case, the difference between the amount of offset of the focal position due to the light polarizing effect of the second liquid-crystal layer 12 and the amount of offset of the focal position due to the light polarizing effect of the third liquid-crystal layer 13 will be further reduced. Therefore, the amount of offset between the focal position of polarized light on which the first and fourth liquid-crystal layers 11, 14 have the light polarizing effect and the focal position of polarized light on which the second and third liquid-crystal layers 12, 13 have the light polarizing effect can be further reduced. As a result, higher imaging performance can be achieved.

In addition, since in the liquid-crystal lens 1 the first electrode 21 and the second electrode 22 apply an electric field to the first to fourth liquid-crystal layers 11 to 14, a change in voltage between the first electrode 21 and the second electrode 22 causes the first liquid-crystal layer 11 and the fourth liquid-crystal layer 14 to change their optical powers in conjunction with each other and causes the second liquid-crystal layer 12 and the third liquid-crystal layer 13 to change their optical powers in conjunction with each other. Therefore, even if the optical powers of the first to fourth liquid-crystal layers 11 to 14 change, the focal position of the liquid-crystal lens 1 in the plane perpendicular to the optical axis C is less likely to be offset from the optical axis C.

From the viewpoint of increasing the freedom of control of the optical power of the liquid-crystal lens, it is conceivable to provide an electrode pair for application of an electric field for each of the first to fourth liquid-crystal layers individually. In this case, however, the z-direction component of an electric field generated by one electrode pair may have a different orientation from the z-direction component of an electric field generated by another electrode pair. If so, the liquid-crystal layer in question is subject to not only an effect of the electric field generated by the electrode pair sandwiching the liquid-crystal layer but also an effect of the electric field which is generated by the other electrode pair and whose z-direction component has a different orientation. Therefore, in such a case, the shape of the line of electric force is likely to deviate from a desired shape, so that the wavefront aberration may be increased.

To cope with this, in this embodiment, the first to fourth liquid-crystal layers 11 to 14 are sandwiched by a pair of first and second electrodes 21, 22 and the pair of first and second electrodes 21, 22 apply an electric field to the first to fourth liquid-crystal layers 11 to 14. Thus, a single electric field is applied to each of the first to fourth liquid-crystal layers 11 to 14. Therefore, the wavefront aberration can be reduced.

It is also conceivable to employ the following configurations.

Figure 4:
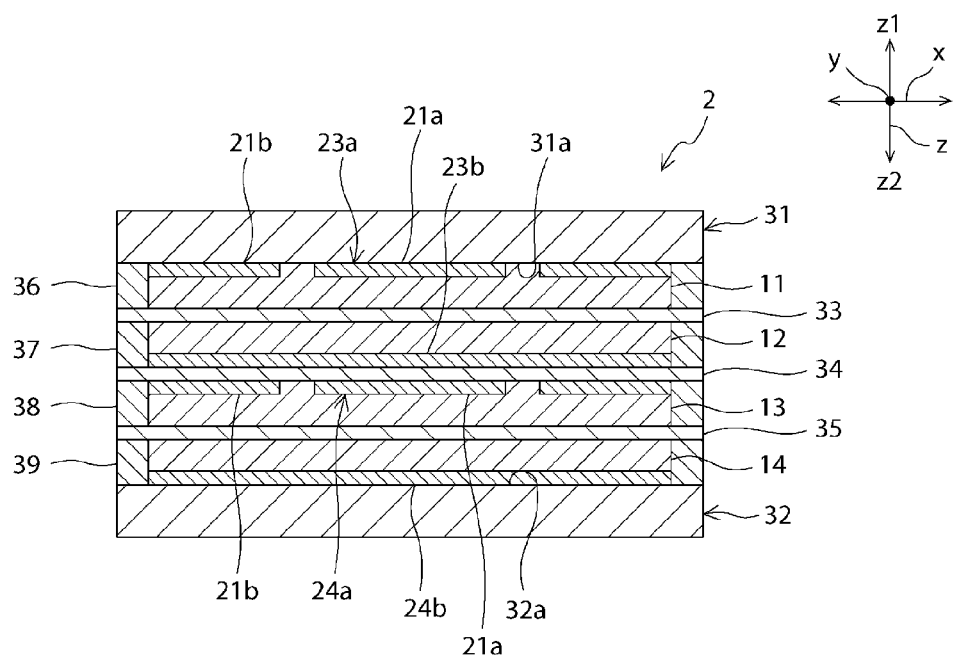
FIG. 4 is a schematic cross-sectional view of a liquid-crystal lens according to a second embodiment.

For example, a liquid-crystal lens 2 shown in FIG. 4 includes: first and second electrodes 23a, 23b sandwiching first and second liquid-crystal layers 11, 12 and configured to apply an electric field to the first and second liquid-crystal layers 11, 12; and third and fourth electrodes 24a, 24b sandwiching third and fourth liquid-crystal layers 13, 14 and configured to apply an electric field to the third and fourth liquid-crystal layers 13, 14. Of the first and second electrodes 23a, 23b, the first electrode 23a located on the z1 side includes first and second portions 21a, 21b. Of the third and fourth electrodes 24a, 24b, the third electrode 24a located on the z1 side includes first and second portions 21a, 21b.

Figure 5:
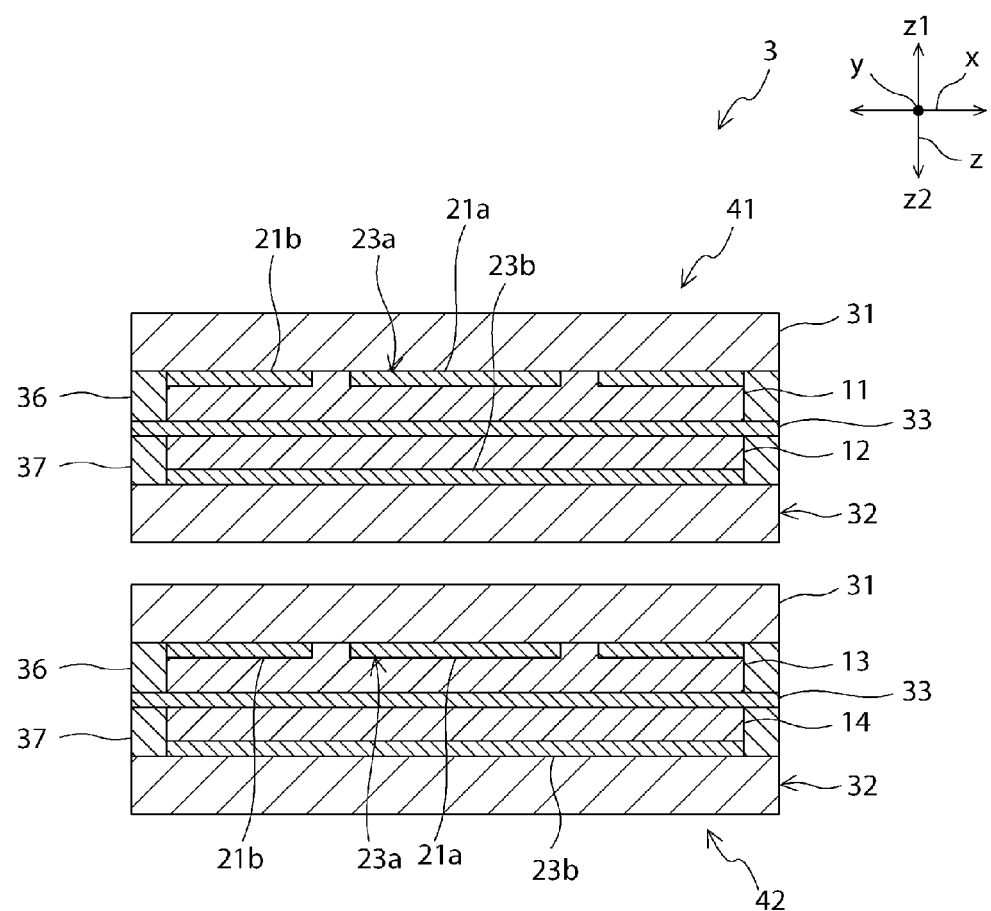
FIG. 5 is a schematic cross-sectional view of a liquid-crystal lens according to a third embodiment.

Alternatively, as shown in FIG. 5, a liquid-crystal lens 3 may be composed of: a first optical element 41 including first and second liquid-crystal layers 11, 12; and a second optical element 42 including third and fourth liquid-crystal layers 13, 14. In this case, the first optical element 41 and the second optical element 42 may be disposed in close contact with each other or with an air layer in between.

By providing, as in the above configurations, a pair of electrodes for the first and second liquid-crystal layers and a pair of electrodes for the third and fourth liquid-crystal layers, the response speed of the liquid-crystal lens can be increased.

REFERENCE SIGNS LIST 1 to 3 . . . liquid-crystal lens
11 . . . first liquid-crystal layer
12 . . . second liquid-crystal layer
13 . . . third liquid-crystal layer
14 . . . fourth liquid-crystal layer
20 . . . cell for the liquid-crystal lens
21, 23a . . . first electrode
21a . . . first portion
21b . . . second portion
22, 23b . . . second electrode
31 . . . first substrate
31a . . . surface of the first substrate
32 . . . second substrate
32a . . . surface of the second substrate
33 to 35 . . . intermediate substrate
36 to 39 . . . spacer member
41 . . . first optical element
42 . . . second optical element
51a, 51b . . . first alignment film
52a, 52b . . . second alignment film
53a, 53b . . . third alignment film
54a, 54b . . . fourth alignment film

The invention claimed is:

1. A liquid-crystal lens comprising:
a first liquid-crystal layer, a second liquid-crystal layer, a third liquid-crystal layer, and a fourth liquid-crystal layer which are arranged in this order along an optical axis of the liquid-crystal lens;
a pair of first alignment films provided to face the first liquid-crystal layer;
a pair of second alignment films provided to face the second liquid-crystal layer;
a pair of third alignment films provided to face the third liquid-crystal layer; and
a pair of fourth alignment films provided to face the fourth liquid-crystal layer; wherein
the first liquid-crystal layer and the second liquid-crystal layer are 90° different in alignment direction from each other in a plane perpendicular to the optical axis,
the first liquid-crystal layer and the fourth liquid-crystal layer are 180° different in alignment direction from each other in the plane perpendicular to the optical axis, and
the second liquid-crystal layer and the third liquid-crystal layer are 180° different in alignment direction from each other in the plane perpendicular to the optical axis.

2. The liquid-crystal lens according to claim 1, wherein a composite focal length of the first liquid-crystal layer and the fourth liquid-crystal layer for incident light having a first polarization direction is equal to a composite focal length of the second liquid-crystal layer and the third liquid-crystal layer for incident light having a second polarization direction.

3. The liquid-crystal lens according to claim 1, further comprising a first electrode and a second electrode which sandwich the first to fourth liquid-crystal layers therebetween and are configured to apply an electric field to the first to fourth liquid-crystal layers.

4. The liquid-crystal lens according to claim 1, further comprising:
a first electrode and a second electrode which sandwich the first and second liquid-crystal layers therebetween and are configured to apply an electric field to the first and second liquid-crystal layers; and
a third electrode and a fourth electrode which sandwich the third and fourth liquid-crystal layers therebetween and are configured to apply an electric field to the third and fourth liquid-crystal layers.

5. The liquid-crystal lens according to claim 1, wherein one of the first and fourth liquid-crystal layers located on one side of the optical axis is thinner than the other liquid-crystal layer located on the other side of the optical axis and one of the second and third liquid-crystal layers located on the one side of the optical axis is thinner than the other liquid-crystal layers located on the other side of the optical axis.

6. The liquid-crystal lens according to claim 1, wherein liquid crystal molecules in one of the first and fourth liquid-crystal layers located on one side of the optical axis have a smaller pretilt angle than liquid crystal molecules in the other liquid-crystal layer located on the other side of the optical axis and liquid crystal molecules in one of the second and third liquid-crystal layers located on the one side of the optical axis have a smaller pretilt angle than liquid crystal molecules in the other liquid-crystal layer located on the other side of the optical axis.

7. A cell for a liquid-crystal lens, the cell being provided with a first interior space to be filled with liquid crystal, a second interior space to be filled with liquid crystal, a third interior space to be filled with liquid crystal, and a fourth interior space to be filled with liquid crystal, the first to fourth interior spaces being disposed in this order along one direction, the cell comprising:
  a pair of first alignment films provided to face the first interior space;
  a pair of second alignment films provided to face the second interior space;
  a pair of third alignment films provided to face the third interior space; and
  a pair of fourth alignment films provided to face the fourth interior space; wherein
  the first to fourth alignment films are provided so that when the first to fourth interior spaces are filled with liquid crystal, the first liquid-crystal layer and the second liquid-crystal layer are 90° different in alignment direction from each other in a plane perpendicular to an optical axis, the first liquid-crystal layer and the fourth liquid-crystal layer are 180° different in alignment direction from each other in the plane perpendicular to the optical axis, and the second liquid-crystal layer and the third liquid-crystal layer are 180° different in alignment direction from each other in the plane perpendicular to the optical axis.

* * * * *